United States Patent
Westerfeld

(10) Patent No.: US 8,328,295 B2
(45) Date of Patent: Dec. 11, 2012

(54) MOTORCYCLE BRAKING DEVICE

(75) Inventor: Helge Westerfeld, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 13/125,950

(22) PCT Filed: Oct. 24, 2008

(86) PCT No.: PCT/JP2008/069298
§ 371 (c)(1),
(2), (4) Date: Jul. 29, 2011

(87) PCT Pub. No.: WO2010/046991
PCT Pub. Date: Apr. 29, 2010

(65) Prior Publication Data
US 2011/0273005 A1    Nov. 10, 2011

(51) Int. Cl.
*B60T 13/00* (2006.01)
(52) U.S. Cl. .................. 303/9.64; 303/137
(58) Field of Classification Search ........ 303/9.62, 303/9.64, 9.69, 9.71, 137
See application file for complete search history.

(56) References Cited

U.S. PATENT DOCUMENTS

| | | | |
|---|---|---|---|
| 6,409,285 B1 | 6/2002 | Wakabayashi et al. | |
| 7,219,965 B2 | 5/2007 | Wagner | |
| 2006/0250022 A1 | 11/2006 | Hasegawa et al. | |
| 2010/0045097 A1* | 2/2010 | Atsushi et al. | 303/16 |

FOREIGN PATENT DOCUMENTS

| | | |
|---|---|---|
| EP | 1964738 A2 | 9/2008 |
| JP | 4146858 A | 5/1992 |
| WO | 2008090783 A1 | 7/2008 |

OTHER PUBLICATIONS

PCT/JP2008/069298 International Search Report.

* cited by examiner

*Primary Examiner* — Christopher Schwartz
(74) *Attorney, Agent, or Firm* — Michael Best & Friedrich LLP

(57) ABSTRACT

The present invention provides a motorcycle braking device which can perform a control which does not give discomforts to a rider in a front and rear wheel interlocking brake control by taking a manipulation of the rider into consideration. In the motorcycle braking device according to the present invention, in a front and rear wheel interlocking brake control, an additional target pressure associated with a brake input pressure of one of a front wheel hydraulic circuit and a rear wheel hydraulic circuit is applied to another wheel driven by the front wheel hydraulic circuit or the rear wheel hydraulic circuit.

9 Claims, 5 Drawing Sheets

MOTORCYCLE BRAKING DEVICE

TECHNICAL FIELD

The present invention relates to a motorcycle braking device, and more particularly to a device which decides a target brake pressure in a front and rear wheel interlocking brake of a motorcycle.

BACKGROUND ART

In a motorcycle, a front wheel brake is manipulated by a front wheel brake manipulation device such as a right brake lever, and a rear wheel brake is manipulated by a rear wheel brake manipulation device such as a right brake pedal. When a proper balance is not taken between a braking force for the front wheel brake and a braking force for the rear wheel brake, there is a possibility that the motorcycle falls down. It is necessary for a rider to manipulate the front wheel brake manipulation device and the rear wheel brake manipulation device so as to maintain a proper balance between the braking force for the front wheel and the braking force for the rear wheel.

Accordingly, in a front and rear wheel interlocking braking device for a motorcycle of the related art, at the time of manipulating the front wheel brake manipulation device (rear wheel brake manipulation device), when the reference deceleration is smaller than preset deceleration, the control device drives the front wheel brake and the rear wheel brake using a brake pressure ratio preset based on a calculation formula, while when the reference deceleration exceeds the preset dangerous deceleration, the control device makes the brake pressure ratio dependent on the reference deceleration and controls the breaking corresponding to an ideal braking force distribution function between the front wheel and the rear wheel. Such a front and rear wheel interlocking brake which controls braking forces of front and rear wheels based on a map on the ideal brake distribution is disclosed in Patent literature 1, for example.

Patent literature 1: JP-T-2005-535513 (International Publication 2004/022395)

SUMMARY

However, when the brake is controlled based on the map on the ideal brake distribution at the time of controlling the front and rear wheel interlocking brake, the brake distribution of front and rear wheels is always forcibly adjusted to the ideal brake distribution based on the map and hence, there is a tendency that a braking force becomes excessively large. Further, in the front and rear wheel interlocking brake control disclosed in patent literature 1 or the like, the modification of the brake pressure by a rider is not effective at all and hence, the rider feels discomforts during the brake manipulation.

Further, in the motorcycle which is not provided with the front and rear wheel interlocking brake, a rider usually memorizes the degree of deceleration of a vehicle body as an amount correlating with a brake input amount by the rider himself. Accordingly, once a brake pressure ratio is decided corresponding to vehicle body deceleration by the front and rear wheel interlocking brake, when the brake pressure ratio is changed corresponding to a road surface state or the like, the rider obtains deceleration different from (slightly stronger than) deceleration corresponding to the previously memorized brake input amount and hence, the rider feels discomforts on the brake.

Further, in the motorcycle which is not provided with the front and rear wheel interlocking brake, the rider adjusts the front and rear wheel brake distribution by adjusting braking inputted by the rider himself and hence, when the rider is not yet skilled in driving manipulation, there exists a possibility that the behavior of the vehicle becomes unstable. In this respect, according to the method of related art, the brake is controlled based on the preset front and rear wheel brake pressure ratio and hence, the stability of the vehicle is secured. However, the adjustment of the front and rear wheel brake distribution due to the brake manipulation by the rider is impossible so that the method of the related art deprives the rider from the pleasure of driving and manipulation.

Accordingly, it is an object of the present invention to provide a motorcycle braking device which can realize a control which does not give discomforts to a rider in a front and rear wheel interlocking brake control by taking a manipulation of the rider into consideration.

With respect to the motorcycle braking device according to the present invention, to overcome the above-mentioned drawbacks, a motorcycle braking device according to the first invention includes a front wheel hydraulic circuit, a rear wheel hydraulic circuit and a control part which controls the front wheel hydraulic circuit and the rear wheel hydraulic circuit, the control part performing a both wheel interlocking brake control such that a braking force to a wheel generated by the front wheel hydraulic circuit and a braking force to a wheel generated by the rear wheel hydraulic circuit are interlocked with each other, wherein the control part measures a brake input pressure generated in one of the front wheel hydraulic circuit and the rear wheel hydraulic circuit by a rider, decides an additional target pressure associated with the brake input pressure, and applies the additional target pressure to the wheel generated by the other of the front wheel hydraulic circuit and the rear wheel hydraulic circuit.

A motorcycle braking device according to the second invention includes a front wheel hydraulic circuit, a rear wheel hydraulic circuit and a control part which controls the front wheel hydraulic circuit and the rear wheel hydraulic circuit, wherein the front wheel hydraulic circuit and the rear wheel hydraulic circuit respectively comprise a brake manipulation device which is manipulated by a rider for braking the wheel, a master cylinder which generates a pressure corresponding to a manipulation of the brake manipulation device, a master cylinder pressure sensor which detects a pressure of the master cylinder, and a wheel cylinder which brakes the wheel using the pressure of the master cylinder, and the control part performs a front and rear wheel interlocking brake control such that a braking force generated by the wheel cylinder of the front wheel hydraulic circuit and a braking force generated by the wheel cylinder of the rear wheel hydraulic circuit are interlocked with each other, wherein the control part measures a brake input pressure generated in one of the front wheel hydraulic circuit and the rear wheel hydraulic circuit by the rider using the master cylinder pressure sensor, decides an additional target pressure associated with the brake input pressure, and applies the additional target pressure to the wheel generated by the other of the front wheel hydraulic circuit and the rear wheel hydraulic circuit.

In the above-mentioned motorcycle braking device, the control part, in the front wheel hydraulic circuit or the rear wheel hydraulic circuit, compares a target pressure to the wheel generated by the hydraulic circuit with a brake pressure applied to the wheel by the hydraulic circuit, and applies the target pressure to said one wheel as the additional target pressure when the target pressure is larger than the brake pressure. In the above-mentioned motorcycle braking device, the control part, in the front wheel hydraulic circuit or the rear wheel hydraulic circuit, compares a target pressure to the wheel generated by the hydraulic circuit with a brake pressure applied to the wheel by the hydraulic circuit, and applies a pressure obtained by subtracting the brake pressure from the target pressure to said one wheel as the additional target pressure when the target pressure is larger than the brake pressure.

In the above-mentioned motorcycle braking device, the control part, when the target pressure is not more than the brake pressure, brakes the wheel with the brake pressure without applying the additional target pressure. In the above-mentioned motorcycle braking device, the wheel is the rear wheel. In the above-mentioned motorcycle braking device, the brake pressure is a pressure of the master cylinder of the rear wheel hydraulic circuit or a pressure of the wheel cylinder of the rear wheel hydraulic circuit. In the above-mentioned motorcycle braking device, in the other of the front wheel hydraulic circuit and the rear wheel hydraulic circuit, the additional target pressure is applied to the wheel irrespective of a brake pressure applied to the wheel by the hydraulic circuit. In the above-mentioned motorcycle braking device, the wheel is the front wheel. In the above-mentioned motorcycle braking device, the brake pressure is a pressure of the master cylinder of the front wheel hydraulic circuit or a pressure of the wheel cylinder of the front wheel hydraulic circuit. In the above-mentioned motorcycle braking device, the additional target pressure is modified by taking a traveling state of a vehicle body into consideration.

The additional target pressure associated with the brake input amount of the rider relating to one brake is inputted to the other wheel and hence, the braking device can acquire the deceleration corresponding to an input expectation value. Simultaneously, the front and rear wheel brake distribution can be also adjusted corresponding to a brake manipulation amount based on the intention of a rider, and the vehicle stability can be also secured due to the additional target pressure (auxiliary brake). Further, even during the front and rear wheel interlocking brake control, the pressure of the interlocking brake is amplified by taking the manipulation of the rider into consideration to some extent and hence, the rider can perform driving with more natural manipulation feeling without feeling discomforts.

When the motorcycle braking device is a motorcycle braking device provided with an ABS, a wheel locking tendency can be alleviated and hence, an inadvertent operation of the ABS can be eliminated whereby discomforts which a rider feels during braking can be decreased.

It is possible to avoid an unnecessary operation of the front and rear wheel interlocking brake which is liable to make a rider feel discomforts.

It is possible to bring the rear wheel which is liable to be locked into a state where the rear wheel is hardly locked. There may be a case where the rear wheel is locked although the front wheel brake is manipulated. In such a case, a rider feels discomforts. The generation of such discomforts can be avoided. In the motorcycle braking device provided with an ABS, the locking of the rear wheel is avoided. At the same time, when the ABS acts only on the rear wheel, the behavior of the rear wheel becomes unstable so that the rear wheel jerks or the vehicle is brought into the under-steering tendency. However, it is also possible to avoid such drawbacks.

By adopting the pressure of the wheel cylinder as the brake pressure, an accurate control can be realized using a pressure corresponding to the portion which actually brakes the wheel. On the other hand, in a case where the pressure of the master cylinder is used as the brake pressure, when the ABS or the interlocking brake is not operated, the pressure of the master cylinder becomes the pressure corresponding to the pressure of the wheel cylinder and hence, the pressure of the master cylinder can be used whereby the pressure of the master cylinder can be used as a substitute when the pressure of the wheel cylinder cannot be detected.

Braking can be applied to a level that locking of the wheel almost occurs due to the brake manipulation of a rider and hence, the rider hardly feels discomforts in his manipulation and the deceleration corresponding to an expectation value which the rider inputs can be acquired. Even in a case where the wheel falls into the locking tendency, when braking device is provided with an ABS, locking tendency can be avoided by the ABS and hence, the rider hardly feels discomforts in his manipulation up to a level that the locking tendency almost occurs.

There exists a possibility that the motorcycle falls down when the front wheel brake is locked. The rider fears locking of the front wheel and hence, even when the braking device is provided with an ABS, there exists a tendency that a weak braking force is applied to the front wheel brake. The additional target pressure is always applied to the front wheel and hence, the braking device can apply a proper braking force.

The additional target pressure is modified corresponding to a traveling state of the vehicle body and hence, it is possible to provide the more proper additional target pressure.

DESCRIPTION OF REFERENCE NUMERALS AND SIGNS

Figure 1:
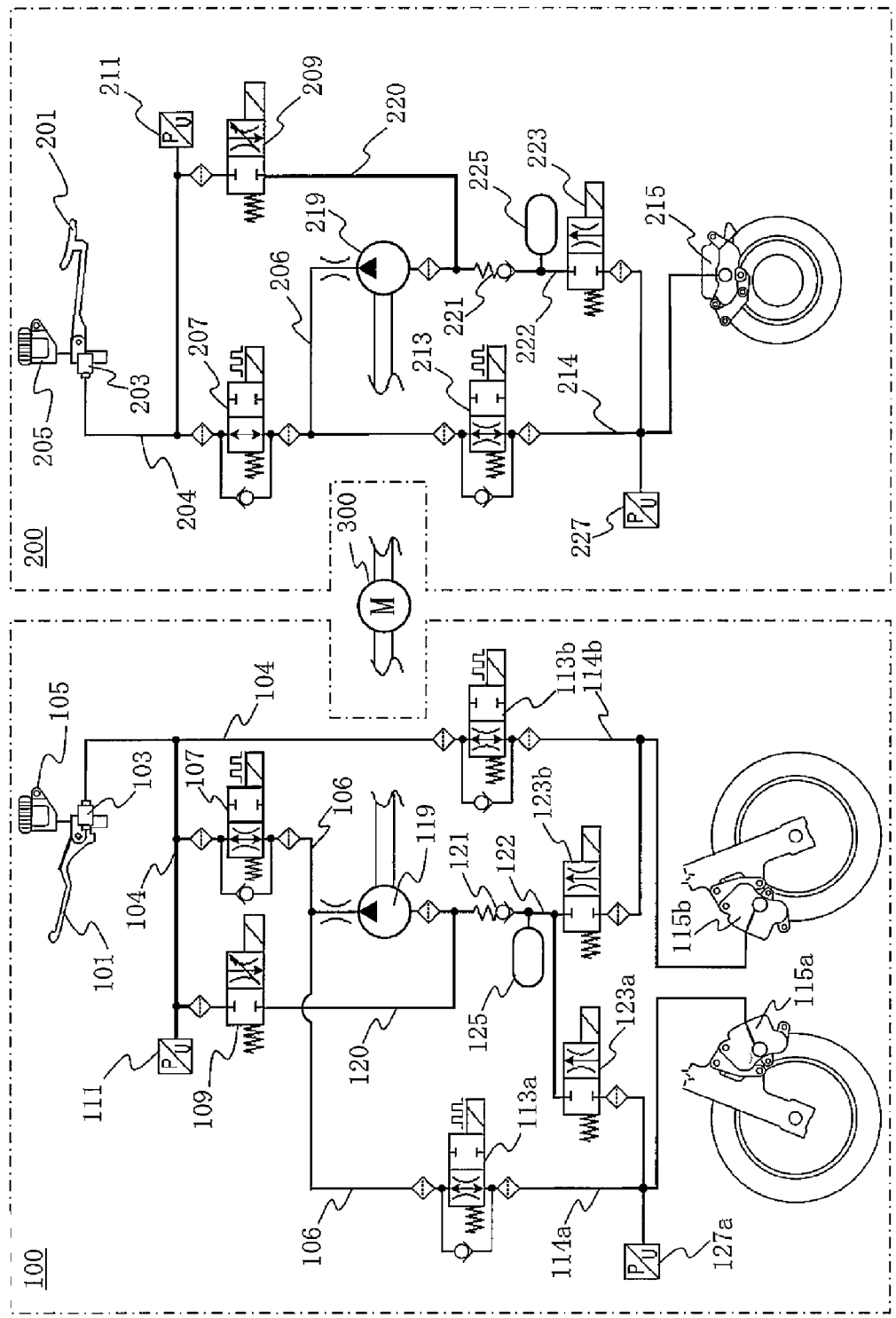
FIG. 1 is a view of a hydraulic circuit used for a brake control device according to one embodiment of the present invention.

400: ECU (control part)
101: brake lever
103: front-wheel-side master cylinder
107: front-wheel-side selector valve
109: front-wheel-side suction valve
113a: front-wheel-side first charge valve
113b: front-wheel-side second charge valve
115a: front-wheel-side first wheel cylinder
115b: front-wheel-side second wheel cylinder
119: front-wheel-side hydraulic pump
121: front-wheel-side first check valve
201: brake pedal
203: rear-wheel-side master cylinder
207: rear-wheel-side selector valve
209: rear-wheel-side suction valve
213: rear-wheel-side charge valve
215: rear-wheel-side wheel cylinder
219: front-wheel-side hydraulic pump 221: rear-wheel-side check valve
225: rear-wheel-side reservoir

DETAILED DESCRIPTION

An embodiment relating to a braking device for a motorcycle according to the present invention is explained in conjunction with FIG. 1 to FIG. 5. The present invention is characterized in that an additional target pressure associated with a brake input pressure in one of a front wheel hydraulic circuit and a rear wheel hydraulic circuit is applied to the wheel by the other of the front wheel hydraulic circuit and the rear wheel hydraulic circuit at the time of performing a front and rear wheel interlocking brake control.

FIG. 1 shows a hydraulic circuit of a brake control device according to the present invention. This hydraulic circuit is constituted of a front wheel hydraulic circuit 100, a rear wheel hydraulic circuit 200, and a DC motor 300 which drives hydraulic pumps of the front wheel hydraulic circuit 100 and the rear wheel hydraulic circuit 200 respectively.

Firstly, the constitution of the front wheel hydraulic circuit 100 is explained. The front wheel hydraulic circuit 100 includes a brake lever 101 which a rider manipulates with his right hand, and a front-wheel-side master cylinder 103 which is pressurized when the brake lever 101 is manipulated. The present invention is not limited to a motorcycle which includes a brake lever and a brake pedal. For example, the present invention is also applicable to a scooter where master cylinders of front and rear wheels are manipulated by left and right brake levers. Further, the front wheel hydraulic circuit 100 includes a reservoir 105 for the front-wheel-side master cylinder 103 which is connected to the front-wheel-side master cylinder 103, a front-wheel-side selector valve 107 which is connected to the front-wheel-side master cylinder 103 by way of a pipe line 104, and a front-wheel-side suction valve 109 which is connected to the front-wheel-side master cylinder 103 by way of the pipe line 104. A filter is provided to a connection portion between the pipe line 104 and the front-wheel-side selector valve 107 and to a connection portion between the pipe line 104 and the front-wheel-side suction valve 109 respectively. Further, a pressure sensor 111 is provided to the pipe line 104. The pressure sensor 111 detects a pressure between the front-wheel-side master cylinder 103 and the front-wheel-side selector valve 107 and a pressure between the front-wheel-side master cylinder 103 and the front-wheel-side suction valve 109, and transmits detected pressures to an electronic control unit ECU 400 described later.

Further, a front-wheel-side first charge valve (inlet valve) 113a is connected to the front-wheel-side selector valve 107 by way of a pipe line 106. A filter is also provided to a connection portion between the front-wheel-side selector valve 107 and the pipe line 106 and to a connection portion between the front-wheel-side first charge valve 113a and the pipe line 106 respectively. The front-wheel-side first charge valve 113a is connected to a front-wheel-side first wheel cylinder (front-wheel-side first caliper) 115a by way of the pipe line 114a.

On the other hand, the front-wheel-side second charge valve 113b is directly connected to the pipe line 104. A filter is also provided to a connection portion between the front-wheel-side second charge valve 113b and the pipe line 104. The front-wheel-side second charge valve 113b is connected to a front-wheel-side second wheel cylinder (front-wheel-side second caliper) 115b by way of a pipe line 114b.

The brake control device of the present invention is connected to a front wheel brake which is operated by the front wheel hydraulic circuit 100. The front wheel brake is constituted of a front-wheel-side first wheel cylinder 115a (front wheel interlocking brake) and a front-wheel-side second wheel cylinder 115b (front wheel non-interlocking brake).

The front-wheel-side first wheel cylinder 115a is connected to the front-wheel-side first charge valve 113a by way of the pipe line 114a as described above. The front-wheel-side second wheel cylinder 115b is connected to the front-wheel-side second charge valve 113b by way of the pipe line 114b as described above.

On the other hand, a discharge side of a front-wheel-side hydraulic pump 119 is connected to the pipe line 106 by way of a throttle. A suction side of the front-wheel-side hydraulic pump 119 is connected to a pipe line 120 by way of a filter. The front-wheel-side hydraulic pump 119 is driven by the DC motor 300. One end of a front-wheel-side backflow preventing valve (check valve) 121 is connected to the pipe line 120. A discharge port of the front-wheel-side suction valve 109 is connected to the pipe line 120. The other end of the front-wheel-side check valve 121 is connected to a pipe line 122. The front-wheel-side check valve 121 is arranged so as to prevent backflow from the pipe line 120 toward the pipe line 122.

An inlet end of a front-wheel-side first release valve (outlet valve) 123a is connected to the front-wheel-side first wheel cylinder 115a by way of the pipe line 114a. An outlet port of the front-wheel-side first release valve 123a is connected to the pipe line 122. Further, a filter is provided to a connection portion between the inlet port of the front-wheel-side first release valve 123a and the pipe line 114a. A pressure sensor 127a is provided to the pipe line 114a. The pressure sensor 127a measures a pressure in the pipe line 114a and transmits a pressure signal to the ECU 400.

Further, an inlet port of a front-wheel-side second release valve 123b is connected to the front-wheel-side second wheel cylinder 115b by way of the pipe line 114b. An outlet port of the front-wheel-side second release valve 123b is connected to the pipe line 122. Further, a filter is provided to a connection portion between the inlet port of the front-wheel-side second release valve 123b and the pipe line 114b.

Next, the constitution of the rear wheel hydraulic circuit 200 is explained in conjunction with FIG. 1. The rear wheel hydraulic circuit 200 includes a brake pedal 201 which the rider manipulates with his right foot, a rear-wheel-side master cylinder 203 which is pressurized when the brake pedal 201 is manipulated, a reservoir 205 for the rear-wheel-side master cylinder 203 which is connected to the rear-wheel-side master cylinder 203, a rear-wheel-side selector valve 207 which is connected to the rear-wheel-side master cylinder 203 by way of a pipe line 204, and a rear-wheel-side suction valve 209 which is connected to the rear-wheel-side master cylinder 203 by way of the pipe line 204. A filter is provided to a connection portion between the pipe line 204 and the rear-wheel-side selector valve 207 and to a connection portion between the pipe line 204 and the rear-wheel-side suction valve 209 respectively. Further, a pressure sensor 211 is provided to the pipe line 204. The pressure sensor 211 detects a pressure between the rear-wheel-side master cylinder 203 and the rear-wheel-side selector valve 207 and a pressure between the rear-wheel-side master cylinder 203 and the rear-wheel-side suction valve 209, and transmits the pressures to the ECU 400.

Further, a rear-wheel-side charge valve 213 is connected to the rear-wheel-side selector valve 207 by way of a pipe line 206. A filter is also provided to a connection portion between the rear-wheel-side selector valve 207 and the pipe line 206 and to a connection portion between the rear-wheel-side charge valve 213 and the pipe line 206 respectively. The rear-wheel-side charge valve 213 is connected to a rear-wheel-side wheel cylinder (rear-wheel-side caliper) 215 by way of a pipe line 214. A rear wheel brake is constituted of the rear-wheel-side wheel cylinder 215. Further, the rear-wheel-side wheel cylinder 215 is connected to the rear-wheel-side charge valve 213 by way of the pipe line 214 as described above.

On the other hand, a discharge side of a rear-wheel-side hydraulic pump 219 is connected to the pipe line 206 by way of a throttle. A suction side of the rear-wheel-side hydraulic pump 219 is connected to a pipe line 220 by way of a filter. The rear-wheel-side hydraulic pump 219 is driven by the DC motor 300. One end of a rear-wheel-side check valve 221 is connected to the pipe line 220. A discharge port of the rear-wheel-side suction valve 209 is connected to the pipe line 220. The other end of the rear-wheel-side check valve 221 is connected to the pipe line 222. The rear-wheel-side check valve 221 is arranged so as to prevent a back flow from the pipe line 220 toward the pipe line 222.

A discharge port of a rear-wheel-side release valve 223 is connected to the pipe line 222. Further, a rear-wheel-side reservoir (accumulator) 225 is connected to the pipe line 222 between the rear-wheel-side check valve 221 and the rear-wheel-side release valve 223.

The rear-wheel-side wheel cylinder 215 is connected to an inlet port of the rear-wheel-side release valve 223 by way of the pipe line 214. An outlet port of the rear-wheel-side release valve 223 is connected to the pipe line 222. Further, a filter is provided to a connection portion between the outlet port of the rear-wheel-side release valve 223 and the pipe line 214. A pressure sensor 227 is provided to the pipe line 214, and the pressure sensor 227 measures a pressure in the pipe line 214 and transmits a pressure signal to the ECU 400.

Figure 2:
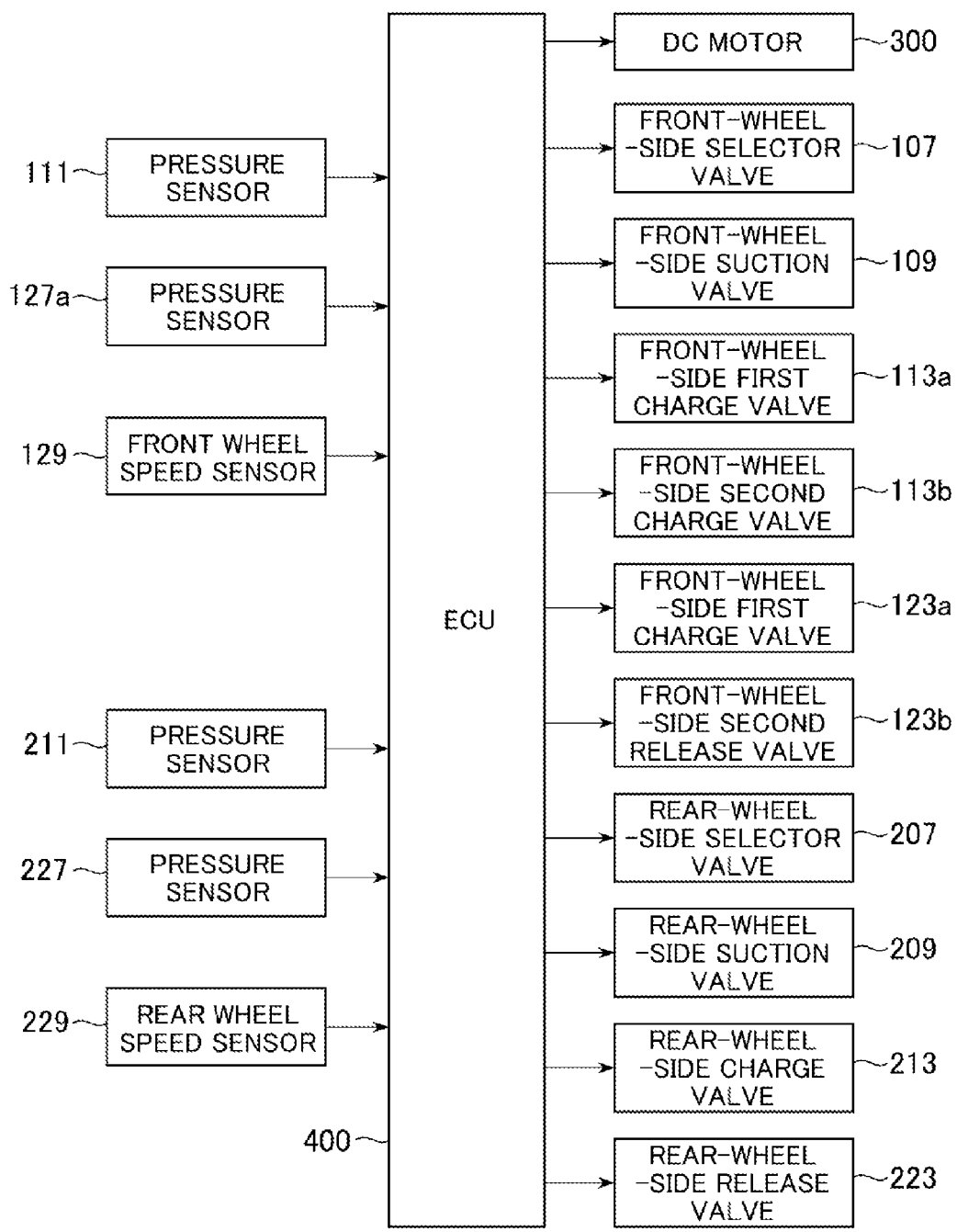
FIG. 2 is a block diagram of the brake control device in FIG. 1.

As shown in a block diagram of FIG. 2, the hydraulic circuit shown in FIG. 1 is controlled by the electronic control unit (ECU) 400 which constitutes a control part. The pressure sensors 111, 127a and a front wheel speed sensor 129 which detects a front-wheel rotational speed are connected to the ECU 400. The pressure sensors 111, 127a transmit respective pressures in the respective pipe lines 104, 114a to the ECU 400 as signals, and the front wheel speed sensor 129 transmits a rotational speed of the front wheel to the ECU 400 as a signal. Further, the pressure sensors 211, 227 and a rear wheel speed sensor 229 which detects rear-wheel rotational speed are connected to the ECU 400. The pressure sensors 211, 227 transmit respective pressures in the respective pipe lines 204, 214 to the ECU 400 as signals, and the rear wheel speed sensor 229 transmits a rotational speed of the rear wheel to the ECU 400 as a signal.

Further, the ECU 400 operates the DC motor 300, the front-wheel-side selector valve 107, the front-wheel-side suction valve 109, the front-wheel-side first charge valve 113a, the front-wheel-side second charge valve 113b, the front-wheel-side first release valve 123a, and the front-wheel-side second release valve 123b respectively in response to manipulation signals, pressure signals and speed signals in accordance with predetermined conditions. Further, the ECU 400 operates the rear-wheel-side selector valve 207, the rear-wheel-side suction valve 209, the rear-wheel-side charge valve 213, and the rear-wheel-side release valve 223 respectively in response to manipulation signals, pressure signals and speed signals in accordance with predetermined conditions. Here, the respective valves are formed of an electromagnetic valve provided with a solenoid, and an open/close state of each valve is changed over with the supply of electricity which is controlled by the ECU 400.

Further, at the time of applying braking, when the ECU 400 receives a rotational speed signal from the front-wheel speed sensor 129 or the rear-wheel speed sensor 229 and detects that the wheel is locked, the ECU 400 operates an antilock braking system (ABS) thus operating the respective hydraulic pumps and opening/closing the respective valves whereby a braking force is controlled thus preventing the wheel from being locked.

The overview of the control carried out in this embodiment of the present invention is as follows. Firstly, in a front-wheel active pressure build-up which is performed in an interlocking manner with a rear-wheel brake input pressure, a front-wheel initial additional target pressure associated with a rear-wheel brake input pressure is decided. Then, the front-wheel initial additional target pressure is modified based on a vehicle-body speed or the like thus deciding a front-wheel modified additional target pressure. A pressure of the front-wheel brake (front-wheel-side first wheel cylinder 115a) is amplified using the front-wheel modified additional target pressure as a front wheel pump-up pressure. Secondly, in a rear-wheel active pressure build-up which is performed in an interlocking manner with a front-wheel brake input pressure, a rear-wheel initial additional target pressure associated with a front-wheel brake input pressure is decided. Then, a rear-wheel initial additional target pressure is modified based on a vehicle-body speed or the like thus deciding a rear-wheel modified additional target pressure. When the rear-wheel modified additional target pressure is larger than a rear-wheel brake pressure (pressure of the rear-wheel-side wheel cylinder 215), a pressure of the rear-wheel brake (rear-wheel-side wheel cylinder 215) is amplified with the rear-wheel modified additional target pressure. Hereinafter, the control carried out in this embodiment is specifically explained in conjunction with flowcharts shown in FIG. 3 and FIG. 4 respectively.

Figure 3:
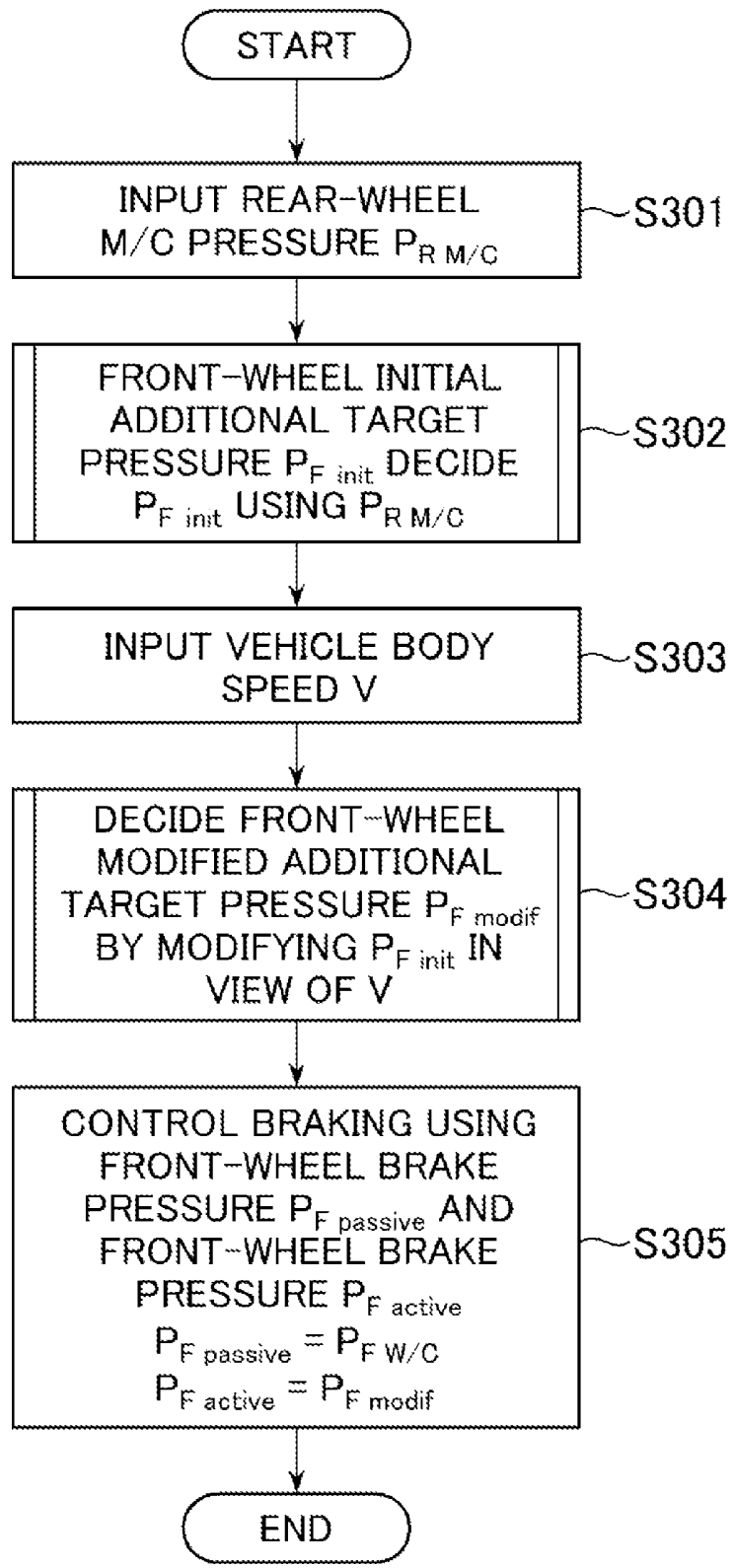
FIG. 3 is a flowchart for controlling a front wheel brake according to one embodiment of the present invention.

FIG. 3 is a flowchart for applying braking to the front wheel using the interlocking brake in accordance with a front and rear wheel interlocking brake control by manipulating the rear-wheel brake pedal 201.

(1) In step S301, a rear-wheel master cylinder (M/C) pressure $P_{R\ M/C}$ which is inputted by the rear-wheel-use brake pedal 201 is measured by the pressure sensor 211, and is inputted to the ECU 400.

(2) In step S302, the ECU 400 calculates a front-wheel initial additional target pressure $P_{F\ init}$ by a given arithmetic formula, a map or the like using the inputted rear-wheel M/C pressure $P_{R\ M/C}$.

(3) In step S303, a vehicle body speed V is measured by the speed sensor 129 or the speed sensor 229, and is inputted to the ECU 400.

(4) In step S304, the ECU 400 decides a front-wheel modified additional target pressure $P_{P\ modif}$ by modifying the front-wheel initial additional target pressure $P_{F\ init}$ by a given arithmetic formula, a map or the like in view of the measured vehicle body speed V.

(5) In step S305, braking of the front wheel is performed by applying a front-wheel brake pressure $P_F$ to the front-wheel brake. The front-wheel brake pressure $P_F$ is constituted of a front-wheel active brake pressure $P_{F\ active}$ applied to a front-wheel-side first wheel cylinder 115a side and a front-wheel passive brake pressure $P_{F\ passive}$ applied to a front-wheel-side second wheel cylinder 115b side. Here, the front-wheel active brake pressure $P_{F\ active}$ is the front-wheel modified additional target pressure $P_{F\ modif}$, and the front-wheel passive brake pressure $P_{F\ passive}$ is a front-wheel-side second wheel cylinder pressure $P_{F\ W/C}$.

Figure 4:
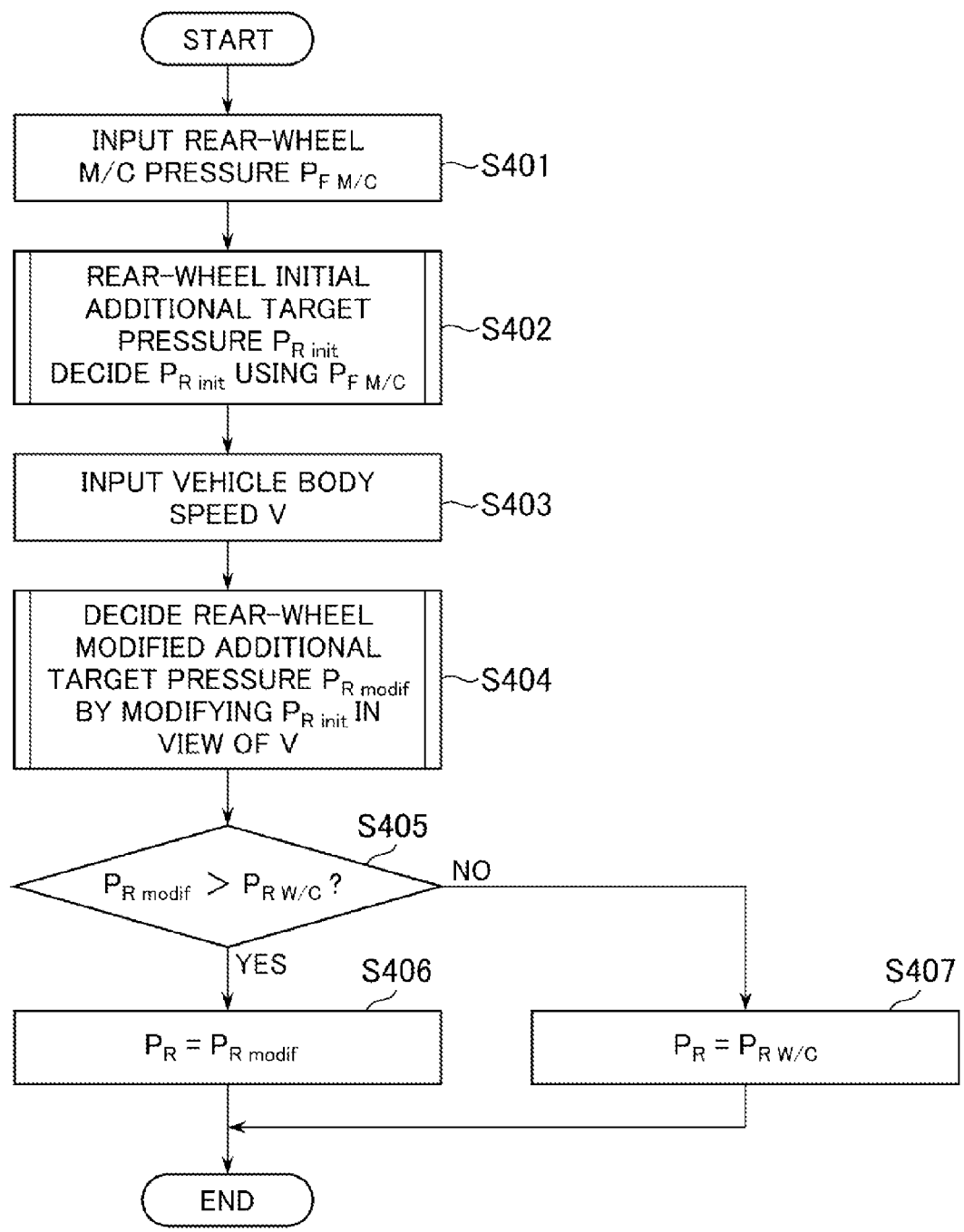
FIG. 4 is a flowchart for controlling a rear wheel brake according to one embodiment of the present invention.

FIG. 4 is a flowchart for controlling the rear wheel using the interlocking brake in accordance with a front and rear wheel interlocking brake control by manipulating the front-wheel brake lever 101.

(1) In step S401, a front-wheel M/C pressure $P_{F\,M/C}$ which is inputted by the front-wheel-use brake lever 101 is measured by the pressure sensor 111, and is inputted to the ECU 400.

(2) In step S402, the ECU 400 calculates a rear-wheel initial additional target pressure $P_{R\,init}$ by a given arithmetic formula, a map or the like using the inputted front-wheel M/C pressure $P_{F\,M/C}$.

(3) In step S403, a vehicle body speed V is measured by the speed sensor 129 or the speed sensor 229, and is inputted to the ECU 400.

(4) In step S404, the ECU 400 calculates a rear-wheel modified additional target pressure $P_{R\,modif}$ by modifying the rear-wheel initial additional target pressure $P_{R\,init}$ in view of the measured vehicle body speed V.

(5) In step S405, the ECU 400 determines whether or not the rear-wheel modified additional target pressure $P_{R\,modif}$ is larger than a rear-wheel W/C input pressure $P_{P\,R\,W/C}$ by comparing the rear-wheel modified additional target pressure $P_{R\,modif}$ and the rear-wheel W/C input pressure $P_{R\,M/C}$ with each other. When the rear-wheel modified additional target pressure $P_{R\,modif}$ is larger than the rear-wheel W/C pressure $P_{R\,W/C}$, the process advances to step S406, while when the rear-wheel modified additional target pressure $P_{R\,modif}$ is not larger than the rear-wheel W/C pressure $P_{R\,W/C}$, the process advances to step S407.

(6) In step S406, the ECU 400 amplifies a pressure of the rear-wheel brake (rear-wheel-side wheel cylinder 215) using the rear-wheel modified additional target pressure $P_{R\,modif}$.

(7) On the other hand, in step S407, the ECU 400 does not amplify the pressure of the rear-wheel brake. Accordingly, an input pressure of the rear-wheel-side master cylinder 203 is applied to the rear-wheel brake as the rear-wheel-side wheel cylinder pressure $P_{R\,W/C}$.

Here, the front-wheel modified additional target pressure and the rear-wheel modified additional target pressure can be acquired by multiplying the front-wheel initial additional target pressure and the rear-wheel modified additional target pressure by factors depending on vehicle data such as a predetermined vehicle body speed. In this embodiment, the case shown in FIG. 3 where the rear-wheel brake pressure $P_R$ is acquired based on the front-wheel M/C pressure $P_{F\,M/C}$ and the case shown in FIG. 4 where the front-wheel brake pressure $P_F$ is acquired based on the rear-wheel M/C pressure $P_{R\,M/C}$ pressure adopt the different controls. However, the control of the front wheel and the control of the rear wheel may adopt the same control flow by setting the control shown in FIG. 3 substantially equal to the control shown in FIG. 4.

In the case shown in FIG. 3 or FIG. 4, the inputting of the vehicle body speed V in step S303 or S403 and the modification of the front-wheel and rear-wheel initial additional target pressure in view of the vehicle body speed V into consideration in steps S304 and S404 may be omitted. Further, the vehicle body speed V may be calculated using a global positioning system (GPS). This is because there is a possibility that an error occurs in the speed sensor for detecting the rotation of the wheel when a tire slips. Further, although the vehicle body speed V is taken into consideration in the control shown in the flowchart of FIG. 3 or FIG. 4, the control merely constitutes an example. In addition to the vehicle body speed V or in place of the vehicle body speed V, any one of or a plurality of following vehicle data may be taken into consideration in the control.

(a) Fluctuation or alteration of the wheel speed V may be used in steps S302 and S303 shown in FIG. 3 and in steps S402 and S403 shown in FIG. 4. The fluctuation or the alteration of the wheel speed V is used in an ABS control and hence, it is possible to use the fluctuation or the alteration of the wheel speed V without largely modifying a program. To be more specific, when a vehicle travels on a rough road surface, there exists a tendency that ABS is liable to be operated due to a stepped portion thus weakening braking. Accordingly, in such a case, it is possible to use the initial additional target pressures of the front and rear wheels and/or the modified additional target pressures of the front and rear wheels which are set higher than usual values.

(b) A change in a friction coefficient μ on a road surface may be used in steps S302 and S303 shown in FIG. 3 or in steps S402 and S403 shown in FIG. 4. When a vehicle body moves from a high frictional road surface to a low frictional road surface, the initial additional target pressures for the front and rear wheels and/or the modified additional target pressures for the front and rear wheels which are smaller than usual pressures can be used. When the vehicle body moves from the low friction road surface to the high friction road surface, the initial additional target pressures for the front and rear wheels and/or the modified additional target pressures for the front and rear wheels which are larger than usual pressures can be used. The friction coefficient μ can be obtained by based on slips which are obtained using numerical values of the speed sensors for the front and rear wheels.

(c) The initial additional target pressures for the front and rear wheels and/or the modified additional target pressures for the front and rear wheels may be changed by detecting a yaw rate of the vehicle body or the inclination of the vehicle body using a three-dimensional sensor. For example, snaking (a state where the rear wheel slips on a road surface although the front wheel grips the road surface) occurs when a front-wheel braking force is excessively strong. To alleviate such snaking, the front-wheel modified additional target pressure may be set small.

(d) A floating tendency of the rear wheel may be detected, and the tendency may be used in steps S302 and S303 shown in FIG. 3 and in steps S402 and S403 shown in FIG. 4. The floating tendency of the rear wheel can be calculated by comparing speeds of the front and rear wheels detected by the speed sensors for the front and rear wheels. When it is determined that the rear wheel has a floating tendency, to alleviated a braking force to the front wheel, a front wheel initial additional target pressure or a front wheel modified additional target pressure is set small.

(e) The initial additional target pressures for the front and rear wheels and/or the modified additional target pressures for the front and rear wheels may be controlled by taking a state of an engine which the ECU 400 obtains by communicating with an engine-use ECU (not shown in the drawing) in steps S302 and S303 shown in FIG. 3 or in steps S402 and S403 shown in FIG. 4 into consideration. The state which the ECU 400 can obtain through the communication with the engine-use ECU is whether a throttle is opened or not, whether an engine brake is applied or not or the like.

Figure 5:
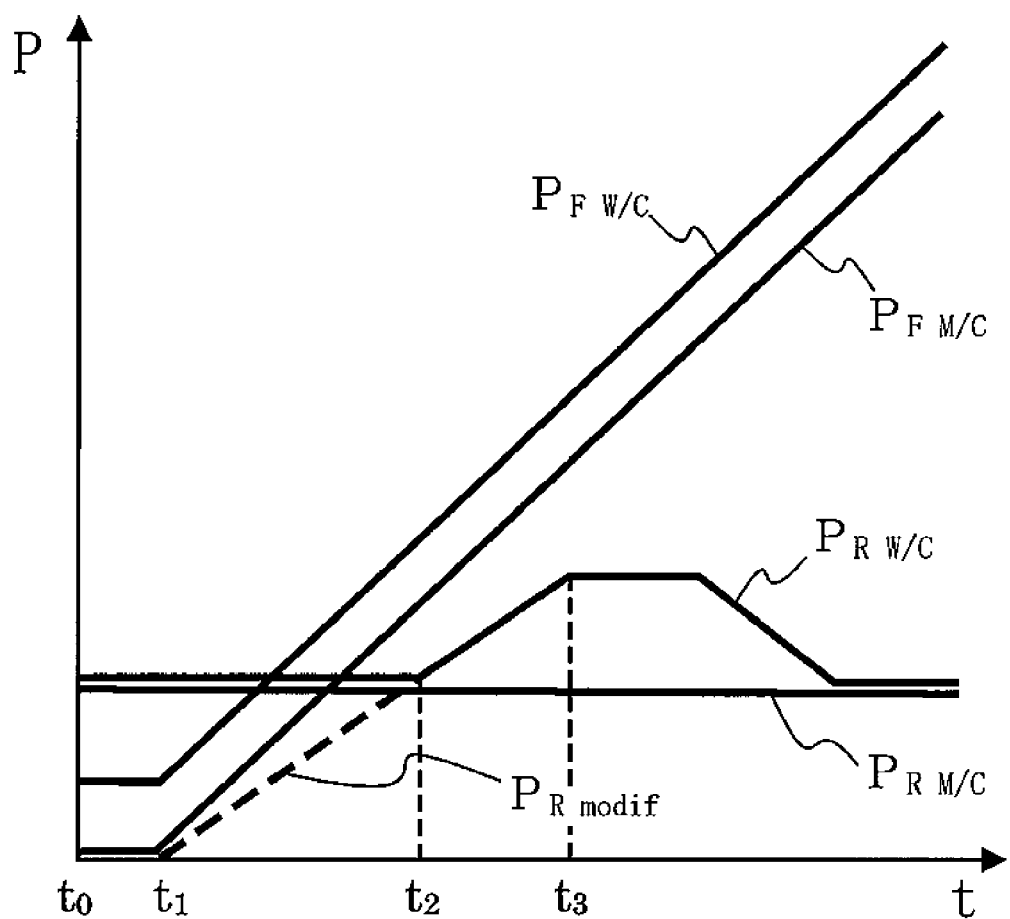
FIG. 5 is a characteristic view showing a change in pressure corresponding to an operation time based on the flowchart shown in FIG. 4.

FIG. 5 is a characteristic graph showing a change in pressure with time for explaining steps S405 to S407 in FIG. 4.

As shown in FIG. 5, a front-wheel master cylinder pressure $P_{F\,M/C}$ and a front-wheel wheel cylinder pressure $P_{F\,W/C}$ are elevated parallel to each other in proportion to a lapse of an operation time. On the other hand, with respect to a rear-wheel master cylinder pressure $P_{R\,M/C}$ and a rear-wheel cylinder pressure $P_{R\,M/C}$, the rear-wheel modified additional target pressure $P_{R\,modif}$ (broken line) is not larger than the rear-wheel wheel cylinder pressure $P_{R\ W/C}$ (steps S405, S407) and hence, braking is performed using the rear-wheel wheel cylinder pressure $P_{R\ W/C}$ from a point of time $t_1$ to a point of time $t_2$. On the other hand, from the point of time $t_2$ and thereafter, the rear-wheel modified additional target pressure $P_{R\ modif}$ becomes larger than the rear-wheel wheel cylinder pressure $P_{R\ W/C}$ (steps S405, S406) and hence, braking is performed using the rear-wheel modified additional target pressure $P_{R\ modif}$ as a rear-wheel brake pressure, and the rear-wheel modified additional target pressure $P_{R\ modif}$ is applied to the rear-wheel-side wheel cylinder 215 up to a point of time $t_3$ where lock tendency appears.

According to the present invention, a map for deciding an additional target pressure corresponding to a type of vehicle such as an American type or a rider type can be set individually between the front wheel and the rear wheel. Further, due to the realization of individual setting of the map, a logic for an active pressure build-up can be set individually between the front and rear wheels and hence, setting of the logic corresponding to a type of vehicle can be realized. For example, in case of the American type motorcycle, an active pressure build-up amount can be set such that a braking force for a rear wheel is set larger than a braking force for the front wheel which is set in accordance with the ideal brake distribution, or a braking force for the front wheel is set smaller than a braking force for the rear wheel set in accordance with the ideal brake distribution. Setting of the braking force may be reversed in case of the rider type motorcycle.

The present invention can impart deceleration which a rider expects even when a braking force is deviated from the ideal brake distribution. Operation feelings of a rider are decided based on input pressure applied to the brake lever or the brake pedal. According to the invention disclosed in patent document 1, a control of braking forces is changed based on the reference deceleration and hence, when a road surface state is changed, operation feelings of a rider are influenced by such a change.

In the invention disclosed in patent document 1, locking of a wheel is prevented by deciding braking forces of front and rear wheels based on the ideal distribution. To the contrary, according to the present invention, braking forces may be decided based on a map which allows locking without using the ideal distribution. However, when the braking forces fall into lock tendency, such tendency is modified by an ABS. In this manner, according to the present invention, braking can be inputted up to a maximum value level at which locking tendency almost occurs.

In this manner, according to the present invention, an additional target pressure is applied up to the condition where lock tendency almost occurs and hence, a range where an operation can be performed corresponding to the manipulation by a rider is broadened whereby the rider feels discomforts less times. Compared to the invention disclosed in patent document 1, according to the present invention, even when braking at a level that locking tendency almost occurs is inputted, a rider hardly feels discomforts in his manipulation. In a motorcycle provided with a front and rear wheel interlocking brake as in the case of the invention disclosed in patent document 1, tendency that front wheel braking becomes excessively strong is observed. Accordingly, when a rider who is not familiar with a front and rear wheel interlocking brake manipulates the brake, a vehicle body pitches forward and hence, the rider feels discomforts. In the invention disclosed in patent document 1, when a rider strongly steps on a brake so that a rear wheel becomes almost locked, an ideal distribution map for front and rear wheel brakes is changed over such that a braking force for the front wheel brake is increased more whereby a rider feels discomforts.

Particularly, in the motorcycle which is obtained by carrying out the invention disclosed in patent document 1, when a rider manipulates a brake at the time of driving the motorcycle at a low-speed, the rider who is not familiar with the behavior of the front and rear wheel interlocking brake is liable to fall down. This is because when the braking is made, the behavior of the vehicle body at braking differs from the behavior of the vehicle body which the rider expected. According to the present invention, an actual braking force approximates a value which a rider expected and hence, the rider does not fall down even during driving at a low speed.

The present invention can reproduce the behavior of the vehicle body where a front wheel suspension sinks when the front wheel brake is operated and a rear wheel suspension sinks when the rear wheel brake is operated.

When the behavior of the vehicle body which a rider expects (estimates) and the actual behavior of the vehicle body differ from each other at the time of inputting braking by the rider, the vehicle body loses a balance. Although the front and rear wheel interlocking brake of the related art cannot provide the behavior of the vehicle body corresponding to inputting of braking by a rider, the present invention can perform a control corresponding to inputting of braking by a rider.

The invention claimed is:

1. A motorcycle braking device comprising: a front wheel hydraulic circuit; a rear wheel hydraulic circuit and a control part which controls the front wheel hydraulic circuit and the rear wheel hydraulic circuit; the control part performing a both wheel interlocking brake control such that a braking force to a wheel generated by the front wheel hydraulic circuit and a braking force to a wheel generated by the rear wheel hydraulic circuit are interlocked with each other, wherein
   the control part measuring a first brake pressure generated by one of the front wheel hydraulic circuit and the rear wheel hydraulic circuit and applied to a first wheel,
   the control part determining a target pressure to be generated by the other of the front wheel hydraulic circuit and the rear wheel hydraulic circuit for a second wheel, the target pressure associated with the brake pressure applied to the first wheel,
   the control part measuring a second brake pressure generated by the other of the front wheel hydraulic circuit and the rear wheel hydraulic circuit and applied to the second wheel, and
   the control part applying a third brake pressure to the second wheel when the target pressure is larger than the second brake pressure, the third brake pressure obtained by subtracting the second brake pressure from the target pressure.

2. The motorcycle braking device according to claim 1, wherein said first wheel is the rear wheel.

3. The motorcycle braking device according to claim 1, wherein the second wheel is the front wheel.

4. The motorcycle braking device according to claim 1, wherein the target pressure is modified by taking a traveling state of a vehicle body into consideration.

5. A motorcycle braking device comprising:
   a front wheel hydraulic circuit including a first brake manipulation device which is manipulated by a rider for braking a front wheel, a first master cylinder which generates a pressure corresponding to a manipulation of the first brake manipulation device, a first master cylinder pressure sensor which detects a pressure of the first master cylinder, and a first wheel cylinder which brakes the front wheel using the pressure of the first master cylinder;

a rear wheel hydraulic circuit including a second brake manipulation device which is manipulated by a rider for braking a rear wheel, a second master cylinder which generates a pressure corresponding to a manipulation of the second brake manipulation device, a second master cylinder pressure sensor which detects a pressure of the second master cylinder, and a second wheel cylinder which brakes the rear wheel using the pressure of the second master cylinder; and a control part which controls the front wheel hydraulic circuit and the rear wheel hydraulic circuit, the control part measuring a first brake pressure generated in one of the front wheel hydraulic circuit and the rear wheel hydraulic circuit by the rider using the first or second master cylinder pressure sensor, measuring a second brake pressure generated in the other of the front wheel hydraulic circuit and the rear wheel hydraulic circuit by the rider using the first or second master cylinder pressure sensor, determining an additional target pressure associated with the first brake pressure, the additional pressure being the difference between a target pressure and the second brake pressure when the target pressure is greater than the second brake pressure, the additional pressure being zero when the target pressure is less than the second brake pressure, and applying the additional target pressure to the front or rear wheel by the other of the front wheel hydraulic circuit and the rear wheel hydraulic circuit.

6. The motorcycle braking device according to claim 5, wherein said first brake pressure is generated by the rear wheel hydraulic circuit.

7. The motorcycle braking device according to claim 5, wherein the brake pressure is a pressure of the second master cylinder of the rear wheel hydraulic circuit or a pressure of the second wheel cylinder of the rear wheel hydraulic circuit.

8. The motorcycle braking device according to claim 5, wherein the second brake pressure is generated by the front wheel hydraulic circuit.

9. The motorcycle braking device according to claim 5, wherein the additional target pressure is modified by taking a traveling state of a vehicle body into consideration.

* * * * *